(12) United States Patent
Kim

(10) Patent No.: US 9,796,338 B2
(45) Date of Patent: Oct. 24, 2017

(54) CARD HOLDER FOR VEHICLES

(71) Applicants: Hyundai Motor Company, Seoul (KR); Kia Motors Corporation, Seoul (KR); HYUNDAI MOTOR TECHNOLOGY & ENGINEERING CENTER(CHINA), LTD., Yantai, Shandong (CN)

(72) Inventor: Hyun Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/052,165

(22) Filed: Feb. 24, 2016

(65) Prior Publication Data

US 2017/0166137 A1 Jun. 15, 2017

(30) Foreign Application Priority Data

Dec. 14, 2015 (KR) ........................ 10-2015-0178199

(51) Int. Cl.
| | |
|---|---|
| *B60R 7/08* | (2006.01) |
| *B60R 7/04* | (2006.01) |
| *B60R 7/06* | (2006.01) |

(52) U.S. Cl.
CPC ............... *B60R 7/08* (2013.01); *B60R 7/04* (2013.01); *B60R 7/06* (2013.01)

(58) Field of Classification Search
CPC .... B60R 7/08; B60R 7/04; B60R 7/06; B60R 7/046

USPC ........................ 296/24.34, 37.8, 37.12, 37.13
See application file for complete search history.

(56) References Cited

U.S. PATENT DOCUMENTS

| 1,697,700 | A | * | 1/1929 | Tucker et al. ............ B60R 7/04 |
| | | | | 40/643 |
| 5,012,966 | A | | 5/1991 | Turner et al. |
| 5,158,353 | A | * | 10/1992 | Kimisawa ............... B60R 7/046 |
| | | | | 206/39 |
| 5,660,311 | A | * | 8/1997 | Soltau ....................... B60R 7/06 |
| | | | | 108/45 |

(Continued)

FOREIGN PATENT DOCUMENTS

| CN | 104175964 A | | 12/2014 |
| JP | 2008087699 A | * | 10/2006 |
| KR | 10-2004-0001146 A | | 1/2004 |

(Continued)

*Primary Examiner* — Jason S Morrow
(74) *Attorney, Agent, or Firm* — Mintz Levin Cohn Ferris Glovsky and Popeo, P.C.; Peter F. Corless

(57) ABSTRACT

A card holder for vehicles is provided. The card holder includes an outer holder secured to a vehicle body and having a card storage portion formed therein and an opening formed in a top of the card storage portion into which a card is inserted into or withdrawn from, and an inner holder removably inserted into the card storage portion. The inner holder is biased proximate to one inner side wall of the card storage portion when inserted, and includes a supporting portion, which is bent or protruded from a lower end thereof in which a distal end of the supporting portion is proximate to the opposite inner side wall of the card storage portion. Foreign materials that enter the card storage portion through the opening are removed by withdrawing the inner holder out from the card storage portion.

11 Claims, 9 Drawing Sheets

(56) References Cited

U.S. PATENT DOCUMENTS

| | | | |
|---|---|---|---|
| 9,283,890 B1* | 3/2016 | Huebner | .................... B60R 7/04 |
| 2002/0121533 A1* | 9/2002 | Plate | ......................... B60R 7/04 |
| | | | 224/277 |

FOREIGN PATENT DOCUMENTS

| | | |
|---|---|---|
| KR | 2004-0042680 A | 5/2004 |
| KR | 20-0434492 Y1 | 12/2006 |
| KR | 20-0448782 Y1 | 5/2010 |

* cited by examiner

CARD HOLDER FOR VEHICLES

CROSS-REFERENCE TO RELATED APPLICATION(S)

This application claims priority to Korean Patent Application No. 10-2015-0178199, filed on Dec. 14, 2015, which is incorporated herein by reference in its entirety.

BACKGROUND

1. Field of the Invention

The present invention relates to a card holder for vehicles mounted on interior parts (a dashboard, an armrest, a console box, etc.) within a vehicle to provide a storage space, and more particularly, to a card holder for vehicles, which is additionally equipped with an inner holder to remove or discharge foreign materials from a card storage portion.

2. Description of the Related Art

When a driver requires access to a parking lot of an apartment, a building, etc., an identification (ID) card may be required to be presented or another form of verification or key access. In addition, such entry requirements are sometimes used to enter onto highways. Therefore, a card holder may be provided within a vehicle to provide a driver with convenience for storing a card.

A conventional card holder is mounted on an interior part of the vehicle, such as a dashboard, an armrest, etc., which is located within reach of a driver's hand. Typically, as shown in FIG. 1 of the related art, a card holder is mounted on a console box 1, which is disposed between a driver's seat 3 and a front passenger seat 4. A conventional card holder includes an internal space having a size capable of storing a card or similarly sized object, and one or more apertures 2 or slots are formed above the internal space, through which a card is inserted into the internal space.

However, the conventional card holder having this structure is problematic in that when food, drink, coins, or other foreign materials are introduced into the internal space through the aperture 2, a user cannot remove them from the internal space (e.g., the foreign object is trapped into the slot). Further, when a card is inserted into the internal space while foreign materials remain in the internal space, the card may be soiled. Additionally, when foreign materials accumulate in the internal space, the insertion of the card may be blocked and eventually the card holder loses its function.

SUMMARY

Therefore, the present invention provides a card holder for vehicles, which enables a user to more easily remove foreign materials from the card holder and guides liquid or a similar substance, which has been spilled thereinto, to be discharged.

In accordance with an aspect of the present invention, the above and other objects may be accomplished by the provision of a card holder for vehicles, that may include an outer holder secured to a vehicle body and having a card storage portion formed therein and an opening formed in a top of the card storage portion to permit a card to be inserted into or drawn out of the card storage portion, and an inner holder removably inserted into the card storage portion through the opening, the inner holder being biased proximate to one inner side wall of the card storage portion when the inner holder is inserted into the card storage portion, and having a supporting portion formed at a lower end thereof, the supporting portion being bent or protruded so that a distal end of the supporting portion is proximate to an opposite inner side wall of the card storage portion.

To enable a user to withdraw the inner holder, the inner holder may have a flange bent from the upper end of the inner holder, and the outer holder may have a recess formed in the top surface thereof to allow a user to reach beneath the flange. To prevent the noise of a card rattling due to vibration of the vehicle, the inner holder may have a guide portion formed above the supporting portion to push the card inserted into the card storage portion to maintain the card in close contact with the inner side wall of the card storage portion.

The guide portion may be formed with a portion of the inner holder cut and bent toward the inner side wall of the card storage portion, and two guide portions may be provided to be spaced apart from each other. The outer holder may be formed with a drain aperture to discharge moisture flowing into the card storage portion, and the inner holder may have an auxiliary supporting portion that protrudes from a surface opposite the surface on which the supporting portion is formed, to be maintained upright while the inner holder is fitted in the card storage portion and also while a card is held in the card storage portion. The supporting portion and the auxiliary supporting portion may be disposed above the drain aperture, and may include grooves formed in distal ends thereof to reduce frictional force when the inner holder is withdrawn and to guide moisture that has entered the card storage portion to drop toward the drain aperture.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Now, exemplary embodiments of the present invention will be described in detail with reference to the accompanying drawings so that the above and other aspects of the present invention will be easily understood and realized by those skilled in the art. The exemplary embodiments described in the following specification and shown in the accompanying drawings are illustrative only and are not intended to represent all aspects of the invention, so that it is to be understood that various equivalents and modifications can be made without departing from the spirit of the invention.

In the following description, a detailed description of known functions and configurations incorporated herein will be omitted when it may make the subject matter of the present invention rather unclear. Wherever possible, the same reference numbers will be used throughout the drawings to refer to the same or like parts. It should be understood that the phraseology and terminology used in the following specification and appended claims should not be construed as limited to general and dictionary meanings but be construed as the meanings and concepts according to the spirit of the present invention on the basis of the principle that the inventor is permitted to define appropriate terms for the best explanation.

Figure 1:
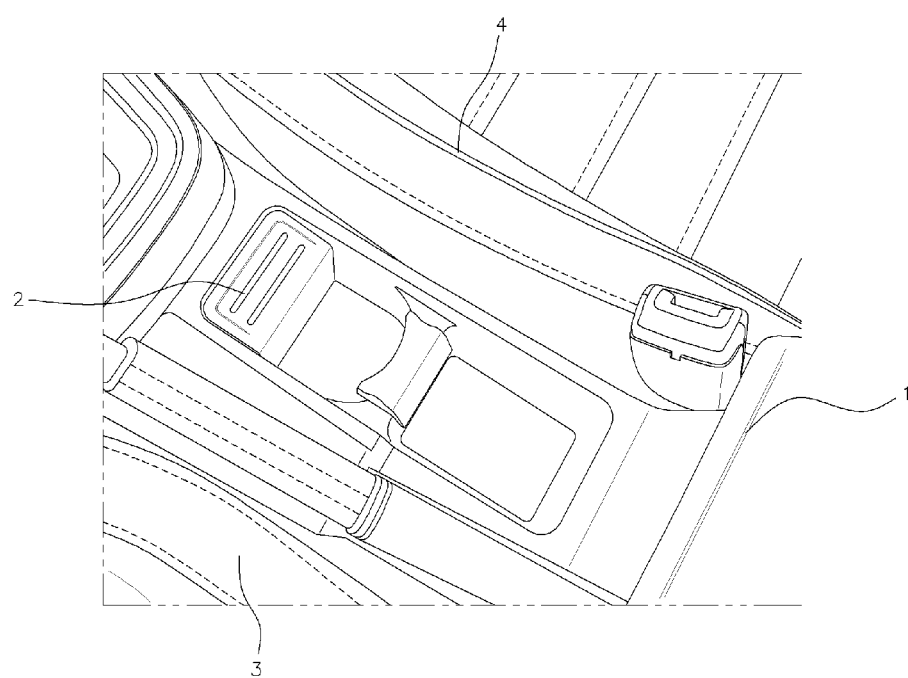
FIG. 1 is a view illustrating a conventional card holder according to the related art.
Figure 2:
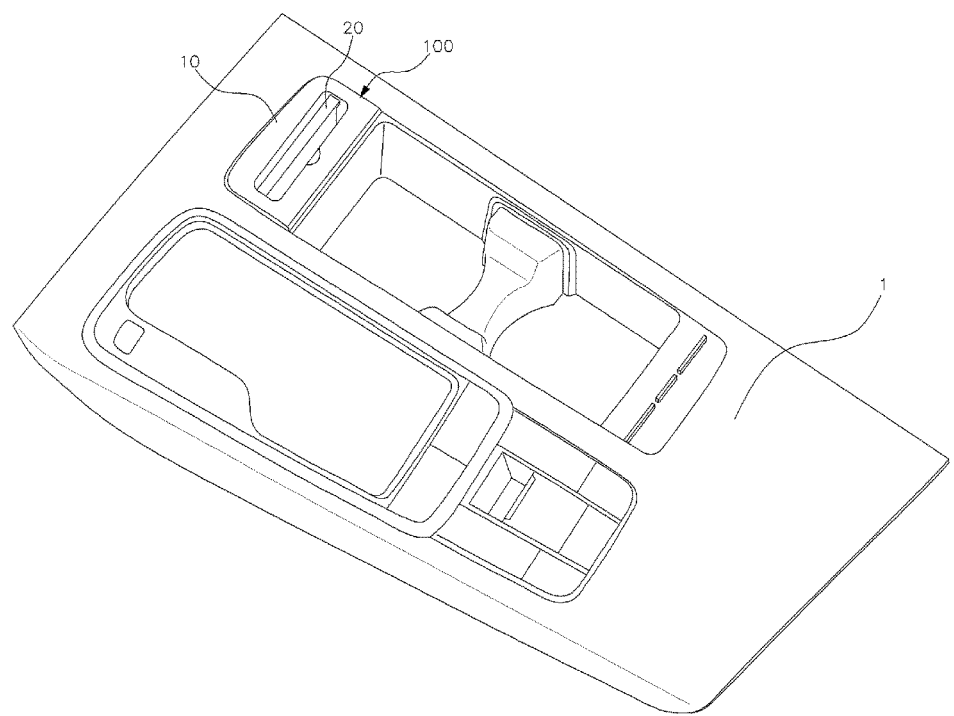
FIG. 2 is a view illustrating a console box on which a card holder for vehicles according to an exemplary embodiment of the present invention is mounted.
Figure 5A:
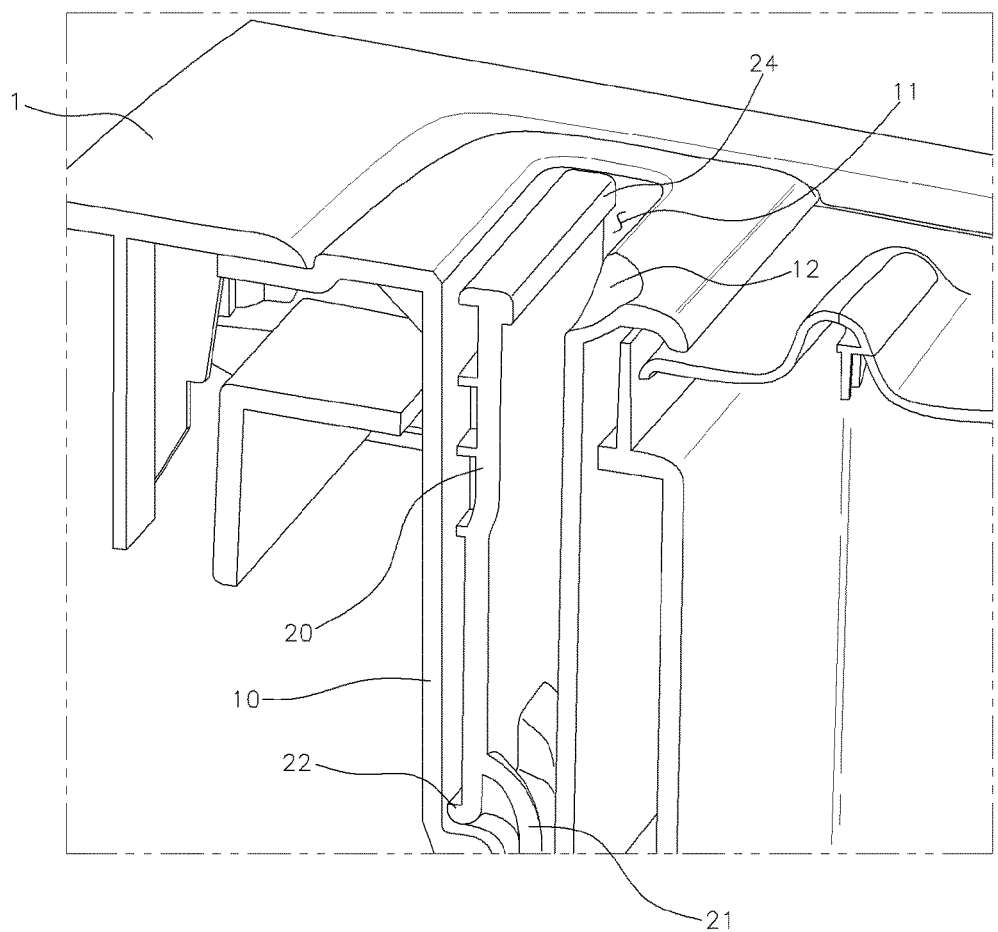
FIG. 5A is a partially cut-away perspective view illustrating the state in which the inner holder is coupled to the outer holder according to an exemplary embodiment of the present invention.
Figure 5B:
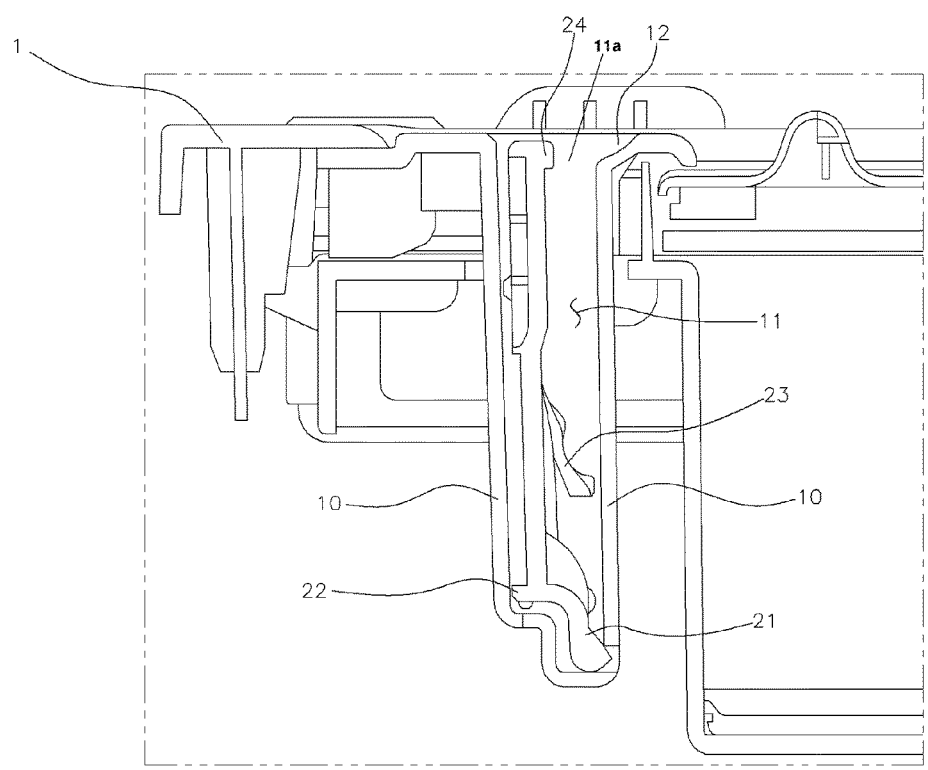
FIG. 5B is a sectional view illustrating the state in which the inner holder is coupled to the outer holder according to an exemplary embodiment of the present invention.

A card holder 100 for vehicles according to an exemplary embodiment of the present invention, as shown in FIG. 2, may be mounted on a console box 1 and an opening 11a (refer to FIG. 5B) thereof may be directed upwards, and the card holder 100 may also be mounted on a vehicle interior part (when possible), such as a dashboard, an armrest, etc., disposed within reach of a driver's hand, without limitation.

Figure 3:
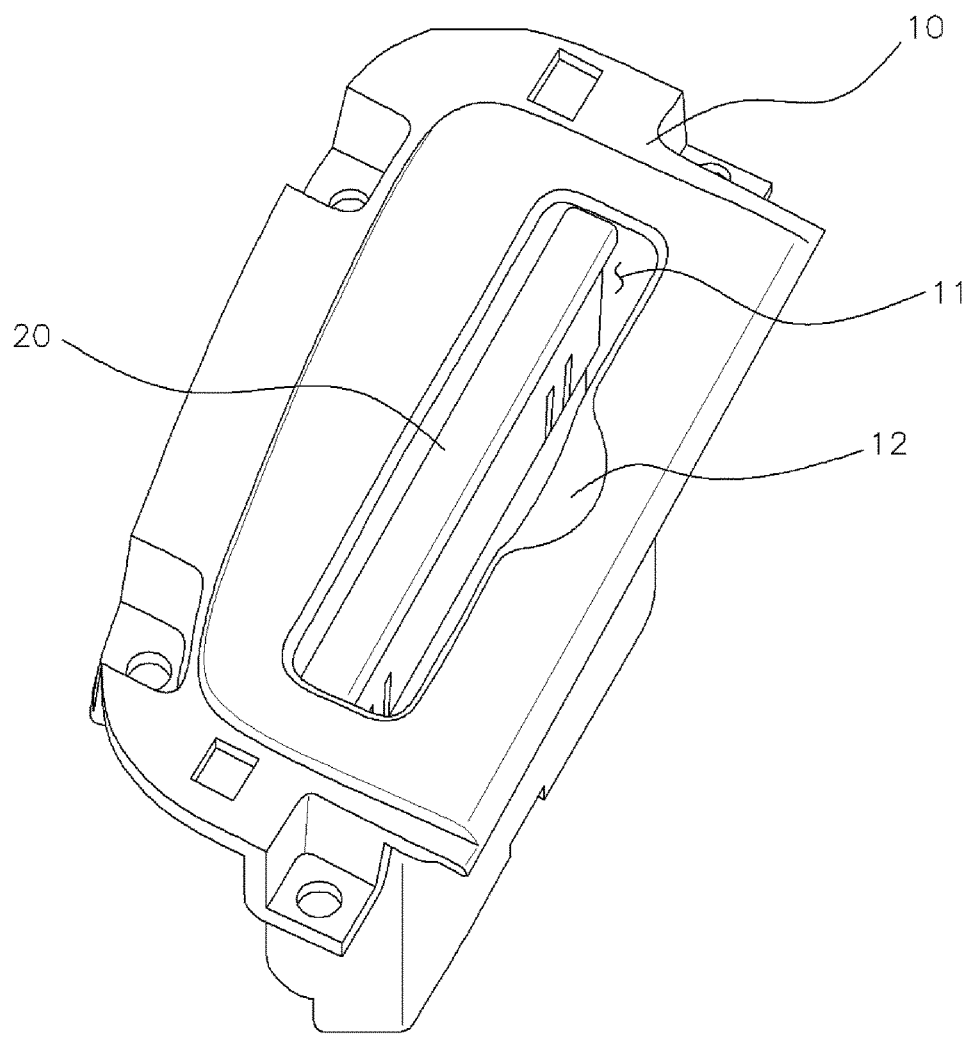
FIG. 3 is a view illustrating the card holder for vehicles according to an exemplary embodiment of the present invention.
Figure 6:
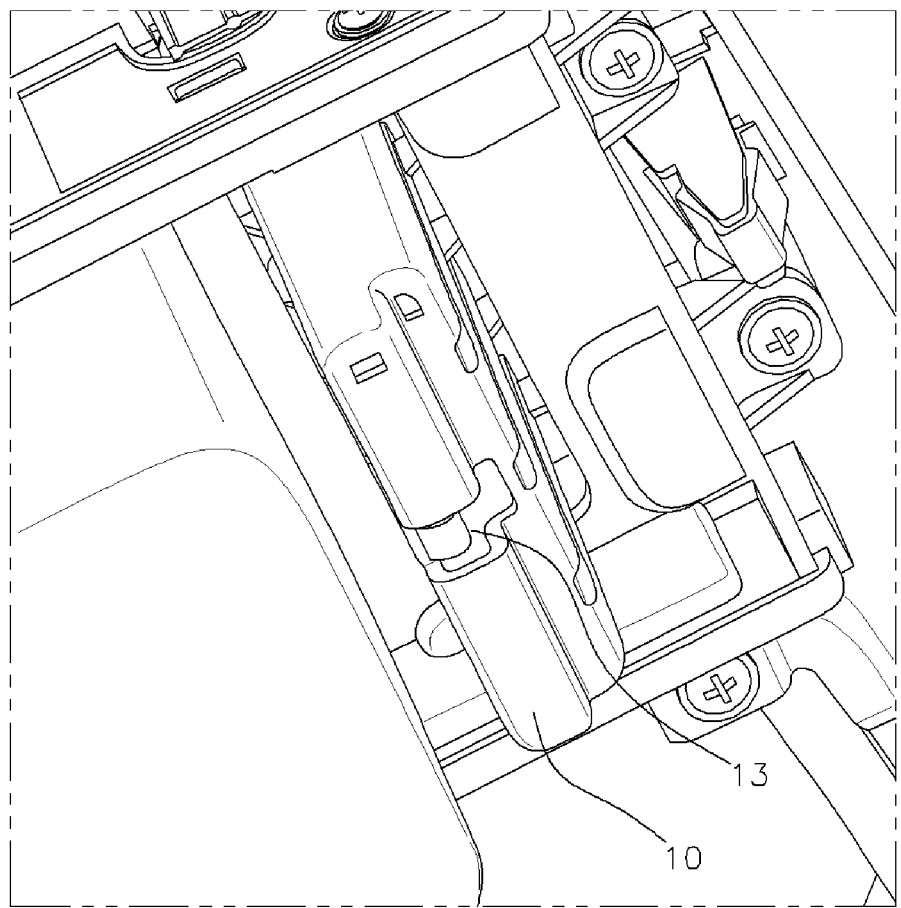
FIG. 6 is a view illustrating the outer holder in which a drain aperture is formed according to an exemplary embodiment of the present invention.

As shown in FIG. 3, the card holder 100 according to the present invention may include an outer holder 10 and an inner holder 20. The outer holder 10 may have a card storage portion 11 formed therein, which has a size and shape suitable for receiving a card inserted thereinto. The card storage portion 11 may have an opening 11a formed in the top thereof, through which a card may be inserted into or drawn out of the card storage portion 11. The outer holder 10 may further include a drain aperture 13 formed in the bottom thereof, as shown in FIGS. 4B and 6, through which moisture, e.g., drink, liquids, fluids, etc., flowing into the outer holder 10 may be discharged (e.g., downwards).

The inner holder 20 may be removably fitted in the card storage portion 11 through the opening 11a. The inner holder 20 may be biased close to (e.g., proximate to, adjacent to, etc.) one inner side wall of the card storage portion 11 when inserted into the card storage portion 11, and may include a supporting portion 21, bent or protruded from the lower end of the inner holder 20 and thus, a distal end of the supporting portion 21 may be proximate to the opposite inner side wall of the card storage portion 11. Foreign materials, as well as cards, that have entered the card storage portion 11 through the opening 11a sit on (e.g., rest on, are stopped onto, etc.) the supporting portion 21. Therefore, when the inner holder 20 is drawn out of the outer holder 10, the foreign materials may be removed from the card storage portion 11.

Figure 4A:
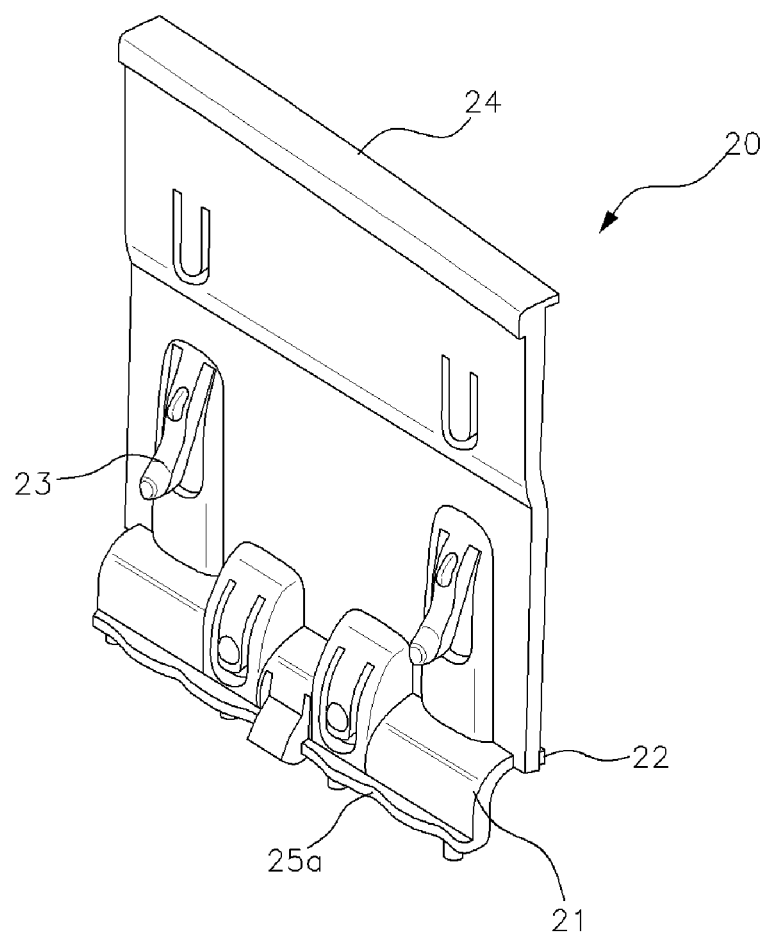
FIG. 4A is a view illustrating an inner holder drawn out of an outer holder shown in FIG. 3 according to an exemplary embodiment of the present invention.
Figure 4B:
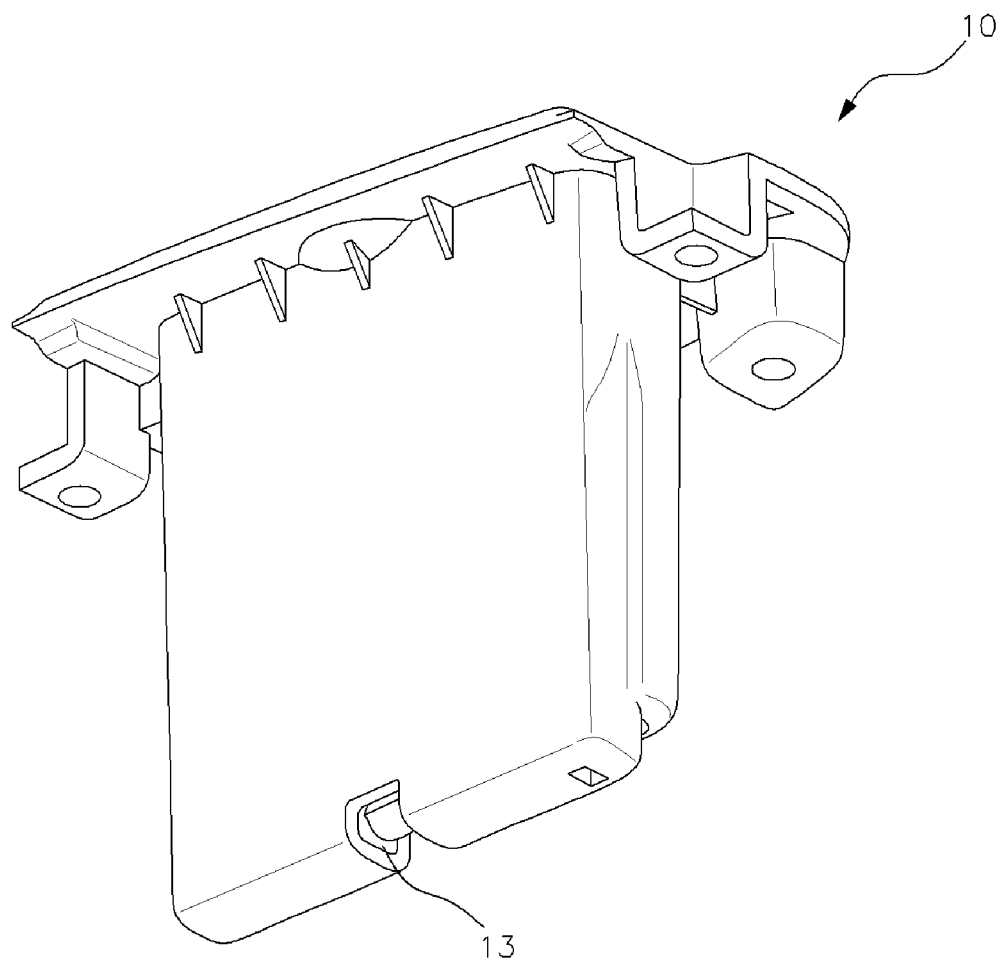
FIG. 4B is a view illustrating the outer holder shown in FIG. 3 as seen from below according to an exemplary embodiment of the present invention.

According to an exemplary embodiment of the present invention, for the inner holder 20 to be more easily withdrawn, as shown in FIGS. 4A-4B, the inner holder 20 may include a flange 24, bent or expanded from the upper end of the inner holder 20, to be increased in thickness, and the outer holder 10 may include a recess 12 formed in the top surface thereof to allow a user to reach (e.g., place his/her finger) beneath the flange 24. Therefore, a user may more easily withdraw the inner holder 20 by reaching beneath the flange 24 through the recess 12 and lifting the inner holder 20 (e.g., upward).

Further, to prevent the noise of a card rattling (e.g., shaking) due to vibration of the vehicle, the inner holder 20 may include a guide portion 23. The guide portion 23 may be formed with a portion of the inner holder 20 cut and bent toward the inner side wall of the card storage portion 11, thereby pushing the card placed on the supporting portion 21 to maintain the card in close contact (e.g., abutting) with the inner side wall of the card storage portion 11. In this exemplary embodiment of the present invention, two guide portions 23 may be provided to be spaced apart from each other.

The inner holder 20 may further include an auxiliary supporting portion 22, which protrudes from the surface opposite the surface on which the supporting portion 21 is formed, to be maintained upright while the inner holder 20 is fitted in the card storage portion 11 and also while a card is held in the card storage portion 11. In other words, the supporting portion 21 may be formed on one surface near the lower end of the inner holder 20, and the auxiliary supporting portion 22 may be formed on the opposite surface near the lower end of the inner holder 20. The supporting portion 21 and the auxiliary supporting portion 22 may be supported by two opposing inner side walls of the card storage portion 11, thereby preventing the inner holder 20 from rattling or shaking.

Figure 7:
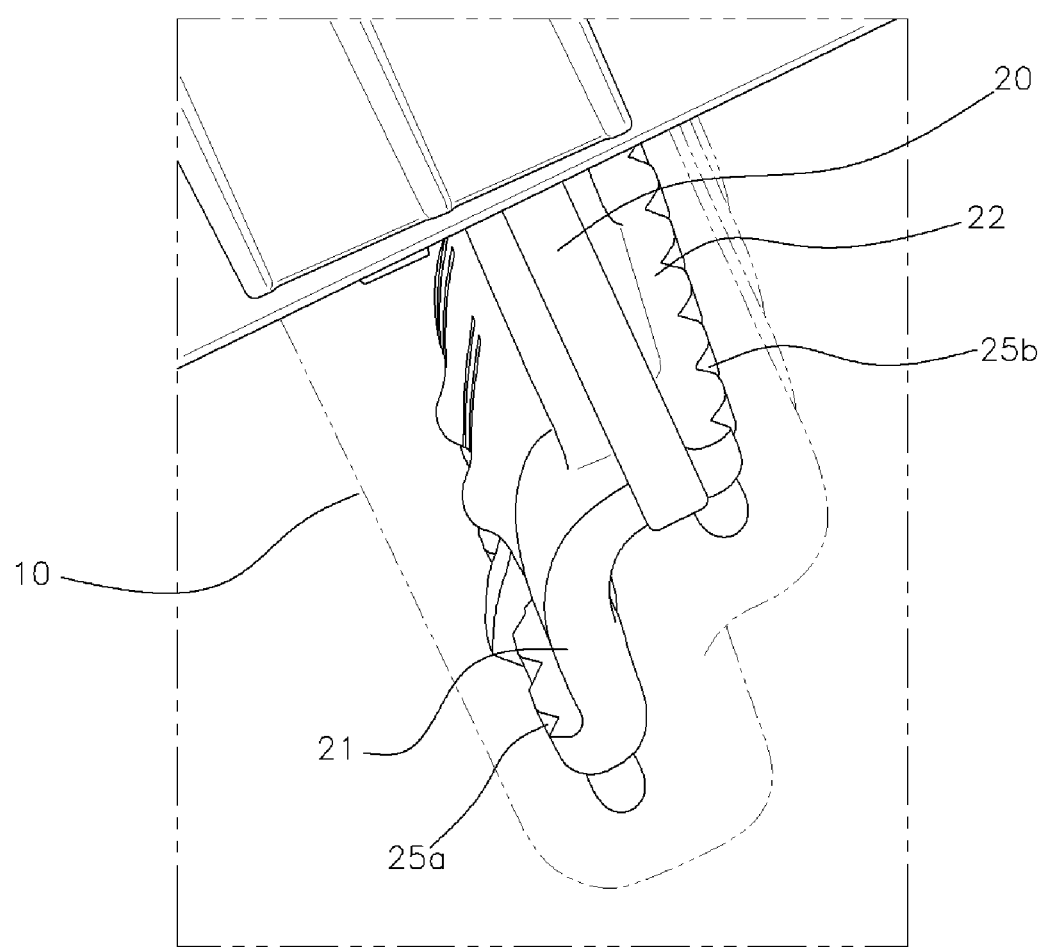
FIG. 7 is a view illustrating the inner holder coupled to the outer holder according to an exemplary embodiment of the present invention.

The supporting portion 21 and the auxiliary supporting portion 22 may be disposed above the drain aperture 13, and, as shown in FIG. 7, may include a plurality of grooves 25a and 25b formed in the distal ends thereof to reduce frictional force when the inner holder 20 is withdrawn and to guide moisture that has entered the card storage portion 11 to drop toward the drain aperture 13. Further, the shape of the grooves 25a and 25b is not limited, however, in the exemplary embodiment described herein, the grooves 25a and 25b may be formed to have a shape in which circular gear teeth are formed consecutively, or may have a sine wave shape, to prevent the inner side walls of the card storage portion 11 from being scraped when the inner holder 20 is inserted into or drawn out of the card storage portion 11.

According to the configuration of the card holder as described above, when foreign materials are introduced into the card storage portion 11 through the opening 11a, the foreign materials sit on (e.g., rest on) the supporting portion 21, and thus a user may more easily remove the foreign materials from the card storage portion 11 by withdrawing the inner holder 20 from the card storage portion 11. Moreover, a user may more easily withdraw the inner holder 20 from the outer holder 10 using the flange 24 of the inner holder 20. Furthermore, since a card may be supported by the guide portion 23, the noise of a card rattling may be prevented while a vehicle is traveling. Additionally, when a drink or other liquid is spilled into the card storage portion 11, the liquid may be discharged through a drain aperture 13. Since the supporting portion 21 and the auxiliary supporting portion 22 prevent the inner holder 20 from rattling inside the outer holder 10, noise generation may be prevented.

As is apparent from the above description, the present invention provides a card holder for vehicles, in which the inner holder having the supporting portion may be fitted in the outer holder, and accordingly, even when foreign materials are introduced into the card storage portion through the opening, the foreign materials on the supporting portion may be removed by withdrawing the inner holder from the card storage portion. Further, the inner holder may be lifted up by virtue of the flange formed at the upper end of the inner holder and the recess formed in the top surface of the outer holder to allow a user to reach beneath the flange (e.g., to access the inner holder).

Furthermore, when a card is inserted into the card storage portion, the guide portion of the inner holder elastically pushes the card to maintain the card in close contact with an inner side wall of the card storage portion, thereby preventing the noise of a card rattling. In addition, fluid flowing into the card storage portion may be discharged through the drain aperture formed in the outer holder, and the supporting portion and the auxiliary supporting portion of the inner holder may include grooves, allowing the fluid to flow downwards while being maintained in close contact with two opposing inner side walls of the card storage portion.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A card holder for vehicles, comprising:
    an outer holder secured to a vehicle body and having a card storage portion formed therein and an opening formed in a top of the card storage portion into which a card is inserted into or withdrawn from; and
    an inner holder removably inserted into the card storage portion,
    wherein the inner holder is biased proximate to one inner side wall of the card storage portion when the inner holder is inserted into the card storage portion, and includes a supporting portion formed at a lower end thereof, the supporting portion being bent or protruded in which a distal end of the supporting portion is proximate to an opposite inner side wall of the card storage portion.

2. The card holder for vehicles according to claim 1, wherein the inner holder includes a flange formed at an upper end thereof so be increased in thickness.

3. The card holder for vehicles according to claim 2, wherein the outer holder includes a recess formed in a top surface thereof to provide access to the flange.

4. The card holder for vehicles according to claim 1, wherein the inner holder includes a guide portion formed above the supporting portion to push the card inserted into the card storage portion to maintain the card in contact with the inner side wall of the card storage portion.

5. The card holder for vehicles according to claim 4, wherein the guide portion is formed with a portion of the inner holder cut and bent toward the inner side wall of the card storage portion.

6. The card holder for vehicles according to claim 5, wherein the guide portion is provided in a plurality and the plurality of guide portions are spaced apart from each other.

7. The card holder for vehicles according to claim 1, wherein the outer holder includes a drain aperture formed therein to discharge moisture flowing into the card storage portion.

8. The card holder for vehicles according to claim 7, wherein the inner holder includes an auxiliary supporting portion that protrudes from a surface opposite the surface on which the supporting portion is formed.

9. The card holder for vehicles according to claim 8, wherein the supporting portion and the auxiliary supporting portion are disposed above the drain aperture, and include a plurality of grooves formed in distal ends thereof to guide moisture, flowing into the card storage portion, to drop toward the drain aperture.

10. The card holder for vehicles according to claim 1, wherein the card holder is mounted on a console box within the vehicle.

11. The card holder for vehicles according to claim 1, wherein the card holder is mounted on a dashboard or an armrest within the vehicle.

* * * * *